US008881187B2

(12) United States Patent  (10) Patent No.: US 8,881,187 B2
Meare                           (45) Date of Patent:       Nov. 4, 2014

(54) LOGGING NETWORK DISCOVERABLE INFORMATION

(71) Applicant: Eldon Technology Ltd., Steeton (GB)

(72) Inventor: David Meare, Oldham (GB)

(73) Assignee: Eldon Technology Limited (GB)

( * ) Notice: Subject to any disclaimer, the term of this patent is extended or adjusted under 35 U.S.C. 154(b) by 0 days.

(21) Appl. No.: 13/672,491

(22) Filed: Nov. 8, 2012

(65) Prior Publication Data

US 2014/0130070 A1    May 8, 2014

(51) Int. Cl.
*H04H 60/33* (2008.01)
*H04N 7/16* (2011.01)
*H04N 5/445* (2011.01)
*G06F 3/00* (2006.01)
*G06F 13/00* (2006.01)
*H04N 21/25* (2011.01)
*G06F 15/173* (2006.01)
*H04N 21/482* (2011.01)
*H04N 21/472* (2011.01)
*H04N 21/845* (2011.01)
*H04L 12/28* (2006.01)

(52) U.S. Cl.
CPC ............. *H04N 21/251* (2013.01); *H04N 21/25* (2013.01); *G06F 15/173* (2013.01); *H04N 21/482* (2013.01); *H04N 21/472* (2013.01); *H04N 21/8456* (2013.01); *H04L 12/2812* (2013.01)
USPC .................................. 725/9; 725/46; 725/49

(58) Field of Classification Search
CPC ...................................................... H04N 21/45
See application file for complete search history.

(56) References Cited

U.S. PATENT DOCUMENTS

| 6,219,839 | B1 * | 4/2001 | Sampsell ......................... 725/40 |
| 7,689,510 | B2 | 3/2010 | Lamkin et al. | |
| 2003/0131355 | A1 * | 7/2003 | Berenson et al. ............... 725/46 |
| 2003/0188171 | A1 * | 10/2003 | DeCenzo et al. ............. 713/185 |
| 2006/0161635 | A1 * | 7/2006 | Lamkin et al. ................. 709/217 |
| 2006/0212827 | A1 * | 9/2006 | Lee ................. 715/810 |
| 2007/0143776 | A1 * | 6/2007 | Russ ............................... 725/14 |
| 2007/0180463 | A1 * | 8/2007 | Jarman ........................... 725/28 |

OTHER PUBLICATIONS

Gordon, Whitson, "Simplify and Automate Private Browsing Mode with These Browser Extensions", LifeHacker, [online], Nov. 23, 2011, <retrieved from the Internet Jun. 18, 2014>, <URL: http://lifehacker.com/5862299/simplify-and-automate-private-browsing-mode-with-these-browser-extensions>.*
Extended European Search Report for European Application No. 13191227.1, mailed Dec. 18, 2013, 5 pages.

* cited by examiner

*Primary Examiner* — Nathan Flynn
*Assistant Examiner* — William J Kim
(74) *Attorney, Agent, or Firm* — Kilpatrick Townsend & Stockton LLP

(57) ABSTRACT

Systems and methods for logging network discoverable information. An indication of user-interest of particular media content may be identified. An address identification parameter that specifies a network file path of the particular media content may be identified based on the indication of user-interest. A location parameter that specifies an estimated physical location of the particular computing device within a computing network may be determined based on the address identification parameter. The address identification parameter may be stored within a network accessible media content log.

15 Claims, 7 Drawing Sheets

LOGGING NETWORK DISCOVERABLE INFORMATION

BACKGROUND

Modern home computer networks may allow a household of users the flexibility to connect thereto using many different types of devices. In such environments, however, a trade-off may exist between network capability and content management. It may therefore be beneficial to provide a mechanism to enable the management of electronic content in the context of delivering and sharing content over a modern home network.

SUMMARY

This Summary does not in any way limit the scope of the claimed subject matter.

In one aspect, a method for logging information associated with network discoverable media content is disclosed. The method may include identifying, by a computing system, an indication of user-interest of particular media content that is associated with a particular computing device other than the computing system, the particular computing device and the computing system at least temporarily connected over a home computing network. The method may further include determining, by the computing system and based on the indication of user-interest, an address identification parameter that specifies a distinct network file path of the particular media content. The method may still further include deriving, by the computing system and based on the address identification parameter, a location parameter that specifies an estimated physical location of the particular computing device within the home computing network. The method may still further include storing, by the computing system, the address identification parameter within a network accessible media content log, the media content log presented within a display associated with the computing system based on user-selection of a particular designator within the display.

In another aspect, a computer-implemented method is disclosed that may include presenting, on a computing system, a network guide that displays a plurality of media content accessible to the computing system over a home computing network. The method may further include identifying, by the computing system, an indication of user-interest of particular media content presented within the network guide. The method may still further include identifying, by the computing system and based on the indication of user-interest, a plurality of parameters associated with the particular media content. The method may still further include generating, by the computing system and based on at least one of the plurality of parameters, an address identification parameter that indicates an approximate physical location of a particular computing device within the home computing network. The method may still further include logging, by the computing system, at least the address identification parameter within a network accessible media content log, the media content log presented within the network guide based on user-selection of a particular designator within the network guide.

In another aspect, a set-top-box is disclosed. The set-top-box may include a first module configured to generate a network guide that displays a plurality of media content that is accessible by the set-top box over a home network. The set-top-box may further include a second module configured to identify an indication of user-interest of particular media content presented within the network guide; and to identify, based on the indication of user-interest, a plurality of parameters associated with the particular media content, the plurality of parameters selected from a resource identification parameter that specifies a distinct identifier of the particular computing device, a content identification parameter that specifies a distinct identifier of the particular media content, a temporal parameter that specifies a preceding date and time of access of the particular media content, and a status parameter that is correlated to the temporal parameter and that specifies a particular state of the particular media content. The set-top-box may still further include a third module configured to generate, based on at least one of the plurality of parameters, an address identification parameter that indicates an approximate physical location of a particular computing device within the home network. The set-top-box may still further include a fourth module configured to record at least the address identification parameter within a network accessible media content log, the media content log presented within the network guide based on user-selection of a particular designator within the network guide.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguishes among the similar components. When only the first reference label is used in the specification, the description is applicable to any one of the similar components having the same first reference label irrespective of the second reference label.

DETAILED DESCRIPTION

Figure 1:
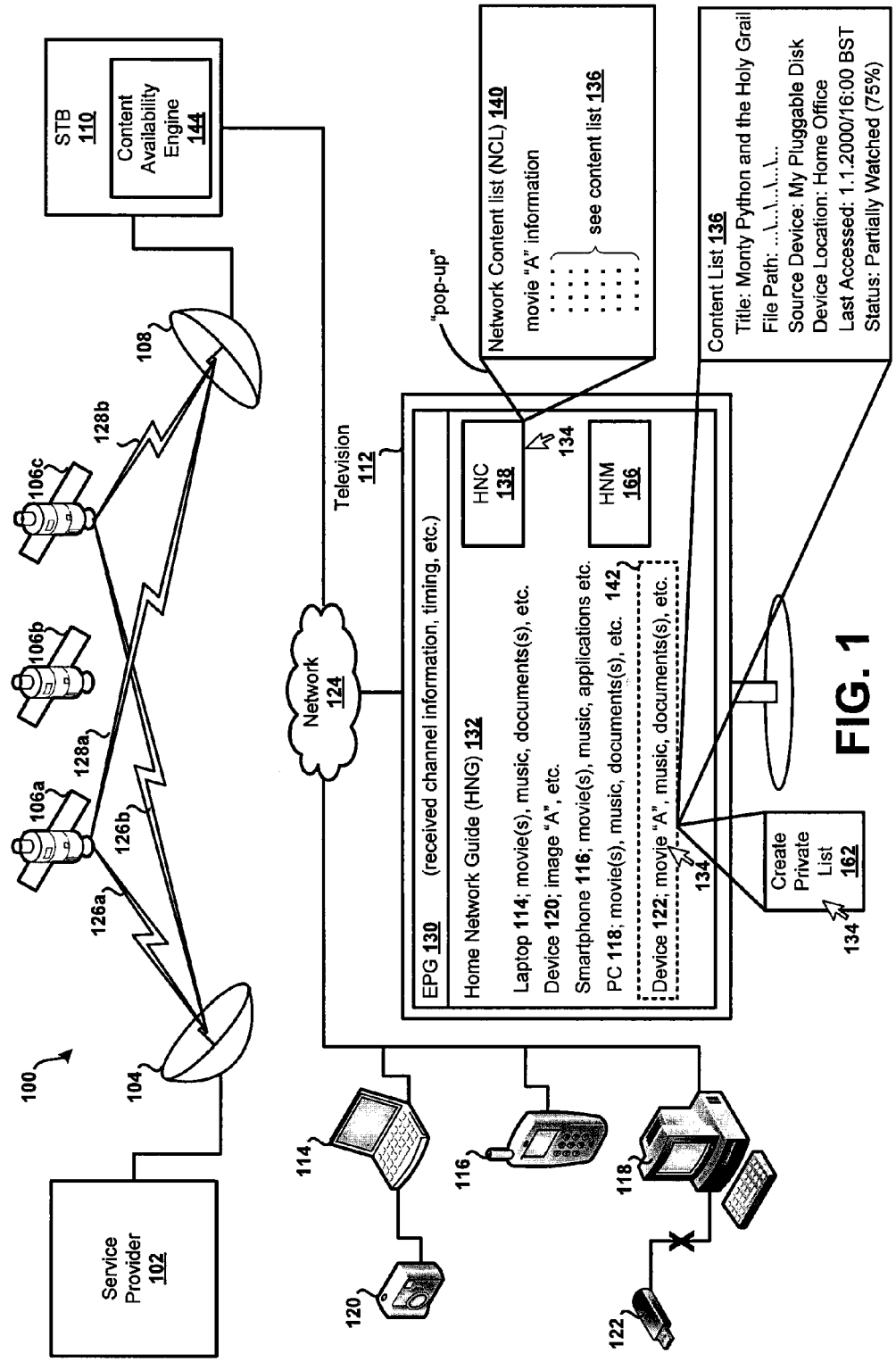
FIG. 1 illustrates an example content distribution system incorporating various aspects of an example home network and an example satellite-based content distribution network.

The present disclosure is directed to systems and methods for logging information associated with network discoverable content, such as media content for example. In one embodiment, the network may correspond to a home computer network. In general, a home network may allow a household of one or more users the flexibility to connect thereto using many different types of devices, and many different types connections. In such environments, any particular device-network connection may appear to be "transient" in nature. For example, in a PNP (Plug and Play) scenario, a pluggable device may be physically coupled to a particular communication interface to connect the pluggable device to a particular home network. Then, following passage of a relatively short period of time (e.g., an hour), the pluggable device may be physically decoupled from the communication interface to disconnect the device from the home network. In a similar scenario, the pluggable device may be physically coupled to a communication interface for a relatively extended period of time (e.g., months), yet may be "powered-down" at some indeterminate point such that the device is disconnected from the home network. The pluggable device may subsequently be "powered-on" such that the device is connected to the network. In these example scenarios, the device-network connection may be "transient" because the availability of any content stored on the pluggable device may appear to fluctuate in time with the "connection" and "disconnection" of the device to the home network. This may, in some instances, present a challenge for a particular user of the household of users.

For example, and continuing with the PNP scenario, particular media content that is stored on the pluggable device may be discovered and then surfaced to a user of another particular device that is connected to the home network. For example, the particular media content may correspond to a particular movie that may be identified and presented as "currently available" content to a particular laptop user when the pluggable device (and the laptop) is connected to the home network. In this example, the particular movie may be partially watched by the user at certain point in time (e.g., "Monday" morning) only to find that at a later time (e.g., "Monday" afternoon), when the user wishes to return to the movie, the movie is no longer available. In general, the user may not be aware of who the particular movie belonged to on the home network, or what "node" in the home network the pluggable device was connected to when the particular movie was originally accessed. The only information that the user may have is that when looking at "currently available" content, that which they are interested in is no longer available.

The present disclosure addresses this and other such issues that may inadvertently develop as users avail themselves of electronic content on home networks, particularly given an increasing flexibility of connection to such networks. In particular, such issues may be addressed by, for example, maintaining and providing user access to a log that may be maintained over the network. In general, the log may retain details of the physical source of particular media content, and point of connectivity of the physical source to the network. Other parameters, such as name of particular content, file path associated with the particular content when the same was last accessed, and other parameters may also be retained within the log. In this manner, various issues associated with the "transient" connection/disconnection of devices to a particular home network may be addressed. For example, from particular set of logged information, a user may be able to readily identify a computing device that is needed to be connected to the home network for them to continue accessing particular media content, as well as a possible physical location of the computing device within a premises associated with the home network environment. This last item may enable or otherwise facilitate the user in tracking down a particular computing device within the premises in instances where it may be required that the particular computing device be connected to the home network for them to continue accessing particular media content.

Although described in the context of a home computer network throughout, the various aspects of the present disclosure may generally be applicable to any scenario in which it is desirable to enable the management of electronic content in the context of delivering and sharing content over a network.

Referring now to FIG. 1, an example content distribution system 100 is shown incorporating aspects of a home computing network and a satellite-based content distribution network. For brevity, the example system 100 is depicted in a simplified and conceptual form, and may generally include more or fewer systems, devices, networks, and/or other components as desired. Further, number and type of features or elements incorporated within the system 100 may or may not be implementation specific, and at least some aspects of the system 100 may be similar to a cable television distribution system and other content distribution systems as well.

In this example, the system 100 may include (e.g., starting in the upper left hand corner of FIG. 1) a service provider 102, a satellite uplink 104, a plurality of orbiting (e.g., geosynchronous) satellites 106a-c (collectively, "satellites 106"), a satellite dish 108, a STB (Set-Top-Box) 110, a television 112, a laptop 114, a smartphone 116, and a personal computer 118. A first pluggable device 120 is shown connected to the laptop 114, and a second pluggable device 122 is shown disconnected (as described further below) to the personal computer 118. The example system 100 may also include an example network 124 that establishes a bi-directional communication path for data transfer between the STB 110 and the other respective elements of the system 100.

In general, the network 124 as described herein may incorporate or exhibit any number of terrestrial and/or non-terrestrial network features or elements. For example, in one embodiment, the network 124 may incorporate or exhibit any number of features or elements of various wireless and/or hardwired packet-based communication networks such as, for example, a WAN (Wide Area Network) network, a HAN (Home Area Network) network, a LAN (Local Area Network) network, a WLAN (Wireless Local Area Network) network, the Internet, or other any type of communication network(s) configured such that data may be transferred among respective elements of the example system 100. Additionally, the respective elements of the example system 100, along with the network 124, may be configured such as to be enable communication(s) in accordance with any particular protocol(s) and/or standard(s) including, for example, TCP/IP (Transmission Control Protocol/Internet Protocol), DLNA/DTCP-IP (Digital Living Network Alliance/Digital Transmission Copy Protection over Internet Protocol), HDMI/HDCP (High-Definition Multimedia Interface/High-bandwidth Digital Content Protection), etc.

In practice, the satellites 106 may be configured to receive uplink signals, such as uplink signals 126a-b, from the satellite uplink 104. In this example, the uplink signals 126a-b may contain one or more transponder streams of particular data or content (e.g., a particular television channel) that is supplied by the service provider 102. For example, each of the respective uplink signals 126a-b may contain various encoded HD (High Definition) television channels, various SD (Standard) television channels, on-demand programming, programming information, and/or any other content in the form of at least one transponder stream and in accordance with an allotted carrier frequency and bandwidth. In this example, different television channels may be carried using different ones of the satellites 106. Different television channels may also be carried using different transponders of a particular satellite (e.g., satellite 106a); thus, such television channels may be transmitted at different frequencies and/or different frequency ranges. For example, a first and second television channel may be carried on a first carrier frequency over a first transponder of satellite 106a, and a third, fourth, and fifth television channel may be carried on second carrier frequency over a first transponder of satellite 106b, or, the third, fourth, and fifth television channel may be carried on a second carrier frequency over a second transponder of satellite 106a, etc.

The satellites 106 may further be configured to relay the uplink signals 126a-b to the satellite dish 108 as downlink signals, such as downlink signals 128a-b. Similar to the uplink signals 126a-b, each of the downlink signals 128a-b may contain one or more transponder streams of particular data or content, such as various encoded and/or electronically scrambled television channels, on-demand programming, etc., in accordance with an allotted carrier frequency and bandwidth. The downlink signals 128a-b, however, may not necessarily contain the same content as a corresponding one of the uplink signals 126a-b. For example, the uplink signal 126a may include a first transponder stream containing at least a first group of television channels, and the downlink signal 128a may include a second transponder stream containing at least a second, different group of television channels. In other examples, the first and second group of television channels may have one or more television channels in common. In sum, there may be varying degrees of correlation between the uplink signals 126a-b and the downlink signals 128a-b, both in terms of content and underlying characteristics.

Continuing with the above simplified example, the satellite dish 108 may be provided for use (e.g., on a subscription basis) to receive television channels provided by the service provider 102, satellite uplink 104, and/or satellites 106. For example, the satellite dish 108 may be configured to receive particular transponder streams, or downlink signals (e.g., downlink signals 128a-b), from the satellites 106. Additionally, the STB 110, which is communicatively coupled to the satellite dish 108, may subsequently select via tuner (not shown), for example, and relay particular transponder streams to the television 112, the television 112, the laptop 114, the smartphone 116, and the personal computer 118 for display thereon as desired. For example, the satellite dish 108 and the STB 110 may, respectively, be configured to receive and relay at least one premium HD-formatted television channel to the television 112. In this example, the premium HD channel may be output to the television 112 from the STB 110 in accordance with the HDMI/HDCP content protection technologies. In another example, the satellite dish 108 and the STB 110 may, respectively, be configured to receive and relay the premium HD channel to the laptop 114. In this example, the premium HD channel may be output to the laptop 114 from the STB 110 in accordance with the DLNA/DTCP-IP content protection technologies. Still other embodiments are possible.

In example embodiments, the STB 110 may be configured to output one or more interfaces to the television 112, laptop 114, smartphone 116, and personal computer 118. For example, as shown in FIG. 1, the STB 110 may be configured to output an EPG (Electronic Programming Guide) 130 to the television 112. In some embodiments, the EPG 130 may present various information related to television channels and the timing of programs appearing on such television channels (e.g., as received from satellites 106). The EPG 130 may further enable a user to browse and select television channels and/or television programs for viewing and/or recording such as, for example, via DVR (Digital Video Recorder) technology that may, in some embodiments, be incorporated within the STB 110. Other embodiments of the EPG 130 are possible. For example, the EPG 130 may generally be any type of interactive guide with continuously updated menus displaying programming or scheduling information for current and upcoming programming, and other features as well.

In accordance with the principles of the present disclosure, the STB 110 may additionally be configured to output a HNG (Home Network Guide) 132 to one or more of the television 112 (e.g., as shown in FIG. 1 in tandem with the EPG 130), laptop 114, smartphone 116, and personal computer 118. In a first aspect, the HNG 132 may present various information related to "currently available" content that is discoverable over the network 124 at a particular point in time. For example, as shown in FIG. 1, the HNG 132 may at least present the information "Laptop 114; movies, music, documents, etc." that, in the broadest sense, identifies the laptop 114 as a physical source of the content "movies" and "music" and "documents" and "etc." Here, for simplicity, only particular content type (e.g., "movies") is listed within the HNG 132 in association with the laptop 114. In practice, however, either the HNG 132 itself or a corresponding interface may list any type of discoverable information associated with each particular "currently available" content item, where type of information may be implementation specific.

For example, in some instances, detailed information associated with a particular "currently available" content item may be presented upon selection of the particular content item via a "point and click" gesture using a cursor 134. For example, the cursor 134 may be used (e.g., via remote handset/control, or other pointing device, or any other human interface device user input) to select a particular movie "A" that is listed within the HNG 132 in association with the device 122. In response to the selection, a content list 136 may be presented that includes various detailed information associated with the movie "A" as stored on the device 122, as well as information associated with the device 122. In general, the content list 136 may be fully or at least partially superimposed over the HNG 132 and/or EPG 130.

In the present example, the detailed information associated with the movie "A" and the device 122 as presented within the content list 136 may include a name of the movie "A" (e.g., "Monty Python and the Holy Grail"), a current network address or file path of the movie "A" (e.g., " . . . \personal computer 118\ device 122\C:\movies\Monty Python and the Holy Grail\ . . . "), a name of the device 122 (e.g. "My Pluggable Disk"), a "probable" physical location of the device 122 (e.g., "Home Office") that may, as described further below, be derived or otherwise inferred from the network address or file path, when the movie "A" was most recently accessed (e.g., "Jan. 1, 2000/16:00 BST"), status of the movie "A" as of when the movie "A" was most recently accessed (e.g., "Partially Watched" such as "75%" complete), as well as any other discoverable information that may be of interest. It will be appreciated that while an example name of the device 122, "My Pluggable Disk," has been mentioned, in practice, any meaningful, distinguishing name may be used and/or assigned to the device 122. In general, swappable memory devices may be named meaningfully. Memory sticks may be supplied with an identifying brand name. If such names are desired to be retained, as they can often aid in physical identification, such as described in further detail below, they may also be supplemented with a serial number. Additionally, hard disk drives, both fixed within devices and external connectable ones, may also be assigned meaningful and distinguishing names. Many other types of "nameable" devices are possible as well.

Such presentation of information within the content list 136 may at least be realized for any particular content within the HNG 132. For example, although not explicitly shown, the cursor 134 may be used to select a particular image "A" that is listed within the HNG 132 in association with the device 120. In response to the selection, the content list 136 may be presented that includes various detailed information associated with the image "A" as stored on the device 120, as well as information associated with the device 120. For example, the detailed information may include a name of the image "A" (e.g., "Vacation"), a current network address or file path of the image "A" (e.g., " . . . \laptop 114\ device 120\C:\photos\Vacation\ . . . "), name of the device that the image "A" is stored on (e.g., "My Camera"), probable physical location of the device 120 (e.g., "Kitchen"), when the image "A" was most recently accessed (e.g., "Feb. 29, 2012/9 AM CST"), status of the image "A" as of when the image "A" was most recently accessed (e.g., "Private" or "Protected"), as well as any other information or detail that may be of interest. In this manner, the HNG 132 (or associated interface component) may generally present various information related to network accessible content that is "currently available."

As understood in view of the preceding discussion, the HNG 132, may allow one or more users flexibility in delivering, sharing, and accessing network-based content (e.g., media content). For example, the device 122 may initially be physically coupled to a particular communication interface (not shown) of the personal computer 118 to connect the device 122 to the network 124. Here, the HNG 132 may present various information related to content stored on the device 122 that is "currently available," as discussed above. However, following passage of a certain period of time (e.g., an hour), the device 122 may be physically decoupled from the personal computer 118 to disconnect the device 122 from the network 124 (e.g., as indicated by the "X" in FIG. 1). In a similar scenario, and assuming that the device 122 is powered by an external power supply (not shown), the device 122 may be "powered-down" at some point such that, while not physically decoupled from the personal computer 118, the device 122 is disconnected from the network 124. This may present a challenge for a particular user.

For example, a particular user may wish to access the movie "A" on the device 122 only to find that the content is no longer accessible, because the device 122 may be disconnected from the network 124. In FIG. 1, disconnection of the device 122 from the network 124 is represented by the intermittent line 142, indicating absence of the device 122 within the HNG 132 and that content stored on the device 122 is no longer "currently available." To address this and other issues, the STB 110 may additionally be configured to output, via the HNG 132, a selectable HNC (Home Network Content) icon 138 that upon selection, such as via a "point and click" gesture using the cursor 134, may present a NCL (Network Content Log) 140 that includes various detailed information associated with the movie "A," as well various detailed information associated with the device 122. In one embodiment, such information may correspond to the detailed information that would have otherwise been presented within the content list 136. A particular user may thus, among other things, select the HNC icon 138 to access the NCL 140 when presented with a task of trying to quickly identify a computing resource (e.g., device 122) that is needed to be connected to the network 124 in order to continue accessing particular media content (e.g., movie "A"), as well as a possible physical location (e.g., "Home Office") of the computing resource in order to locate the particular the computing resource if desired. In this manner, the STB 110 may be configured to address issues associated with "transient" connection/disconnection of devices from the network 124. In accordance with the present disclosure, a content availability engine 144 of the STB 110 (as shown in FIG. 1) may be configured to implement such functionality.

Figure 2:
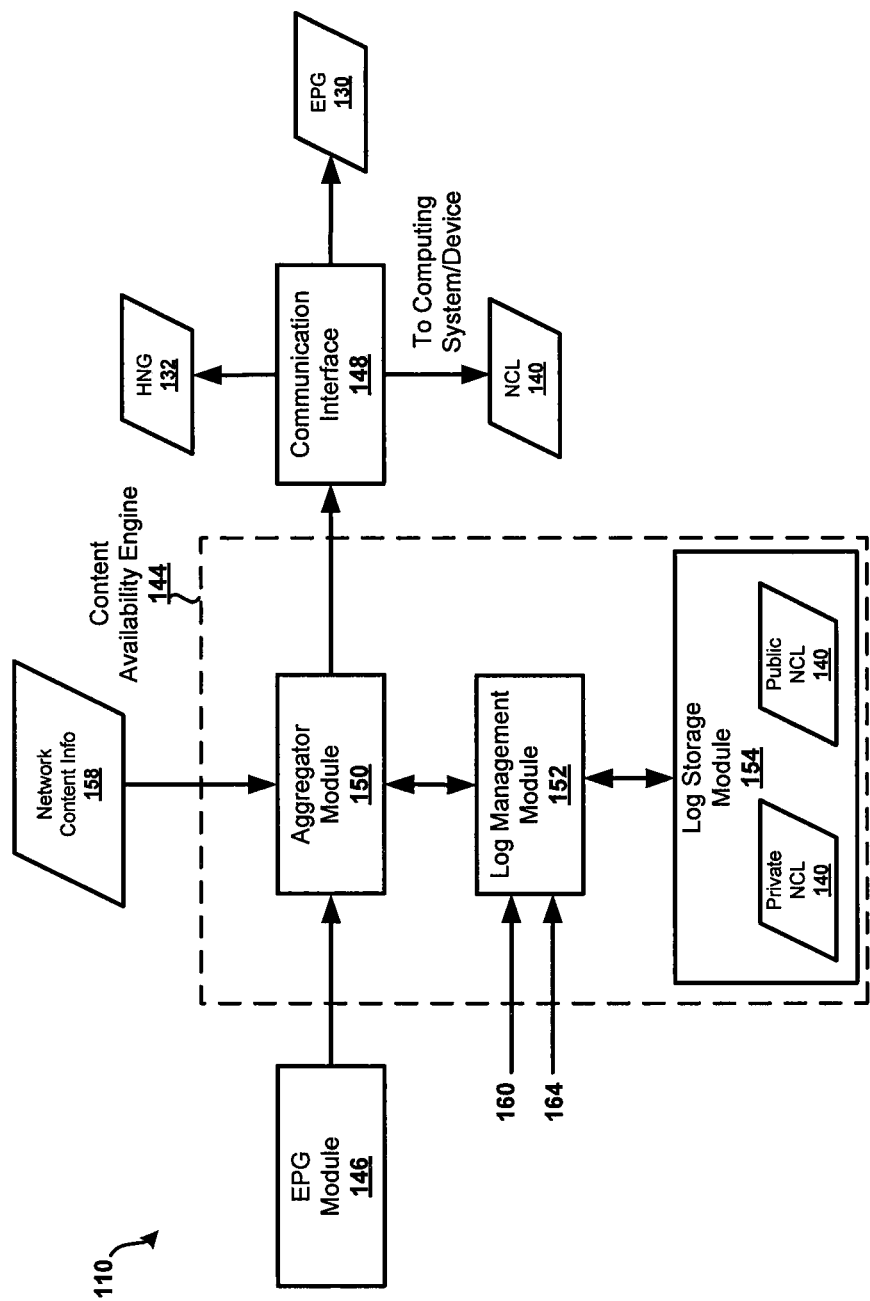
FIG. 2 illustrates a simplified block diagram of an example set-top-box.

For example, and referring now to FIG. 2, a simplified, conceptual block diagram of the STB 110 of FIG. 1 is shown. For brevity, a number of elements of the STB 110 are omitted from the present discussion; however, the STB 110 may be configured to include any number of various components or logical modules that are implemented in hardware, software, firmware, or any combination thereof, and such components or logical modules may or may not be implementation specific. For example, the STB 110 may in certain implementations be configured to include one or more tuners, one or more network interfaces, a NIT (Network Information Table), a DVR, a demultiplexer, a smart card, a descrambling engine, and other various modules or components. However, other embodiments or variations of the STB 110 are possible. For example, the STB 110 may include one or more logical modules configured to implement a TV streaming media functionality that encodes video into a particular format for transmission over the Internet such as to allow users to remotely view and control a home cable, satellite, or personal video recorder system from an Internet-enabled computer with a broadband Internet connection. Still other embodiments are possible.

In the present example, STB 110 may include the content availability engine 144 (as shown in FIG. 1), an EPG module 146, and a communication interface 148. The content availability engine 144 may include an aggregator module 150, a log management module 152, and a log storage module 154. The communication interface 148 of the STB 110 may be configured to enable the transfer of data or information with and between compatibly configured devices via multiple different communication channels, and types of communication channels, some of which may be implementation specific. For example, in a "plug and play" scenario, the communication interface 148 may be configured to communicate or otherwise exchange information, directly or indirectly, with any type or variety of computing device that facilitates the discovery of a hardware component in a particular system without the need for physical device configuration or user intervention in resolving resource conflicts. An example of such a computing device may include, a USB (Universal Serial Bus) device, a television, a laptop, a personal computer. a removable memory card, a smartphone, a video game console, etc.

In practice, the aggregator module 150 may receive network content information 158 from a particular device in response to the particular device being connected to the network 124. For example, upon connection of the device 122 to the personal computer 118, the device 122 may "advertise" content that the device 122 may make available over the network 124, along with various status and identification information, and subsequently provide the content, status, and identification information upon request. For example, the aggregator module 150 may be configured to detect the presence of the device 122 on the network 124, and request detailed information related to the device 122, as well as content stored on the device 122. For example, continuing with above example, the aggregator module 150 may receive detailed information such as a name of the movie "A" (e.g., "Monty Python and the Holy Grail"), a current network file path of the movie "A" (e.g., " . . . \personal computer 118\device 122\C:\movies\Monty Python and the Holy Grail\ . . . "), a name of the device 122 (e.g., "My Pluggable Disk"), a "probable" physical location of the device 122 (e.g., "Home Office"), when the movie "A" was most recently accessed (e.g., "Jan. 1, 2000/16:00 BST"), status of the movie "A" as of when the movie "A" was most recently accessed (e.g., "Partially Watched" such as "75%" complete), as well as any other discoverable information that may be of interest.

In one aspect, upon receipt of the network content information 158, the aggregator module 150 may generate the HNG 132 as shown in FIG. 1, and pass the HNG 132 to the communication interface 148 for output to the television 112 for presentation thereon. Similarly, the aggregator module 150 may receive the EPG 130 from the EPG module 146, and pass the EPG 130 to the communication interface 148 for output to the television 112 for presentation. In another aspect, the aggregate module 150 may be configured to generate one or both of content list 136 and the NCL 140 as shown in FIG. 1, and pass the content list 136 or the NCL 140 to the communication interface 148 for output to the television 112 for presentation. With respect to the content list 136, such an operation may be performed in response to selection of particular content within the HNG 132 (e.g., movie "A"). as described above. With respect to the NCL 140, such an operation may be implemented in response to user-selection of the HNC icon 138.

For example, in response to selection of the HNC icon 138, such as via a "point and click" gesture using the cursor 134, the log management module 152 of the content availability engine 144 may receive a control signal 160 and initially analyze the same to derive an authentication that designates whether a public or private version of the NCL 140 is to be retrieved. An example of an authentication may include a username/password or other type of credential information that may be used by the log management module 152 to determine whether a user and/or a user account associated with the control signal 160 has a private version of the NCL 140 or not. Based on that authentication, the log management module 152 may retrieve a public or a particular, user-specific private version of the NCL 140 from the log storage module 154, and then pass the corresponding NCL 140 to the aggregator module 150. The aggregator module 150 may in turn pass the corresponding NCL 140 to the communication interface 148 for output to the television 112 for presentation.

As mentioned, the log management module 152 may retrieve a public or a particular private version of the NCL 140 from the log storage module 154 based on the control signal 160. In one embodiment, a user may be provided the opportunity to create a personalized, private version of the NCL 140, or utilize a public, non-private version of the NCL 140. Such an implementation may be beneficial in many respects including, for example, providing a tailored, user-specific network content list may facilitate an increasingly positive user quality of experience in the context of delivering and sharing content over a network. For example, and referring now to FIG. 1, when a particular user selects the particular movie "A" that is listed within the HNG 132 in association with the device 122, this may be perceived as an indication of user-interest. In one embodiment, assuming a private version of the NCL 140 has not already been created, a window 162 may be presented in response to the indication of user-interest, in addition or separately from the content list 136, that requests user input to optionally create a private version of the NCL 140. The user may then create a private version of the NCL 140 that is rights protected by the content availability engine 144 in accordance with a credentialing mechanism such as, for example, username/password authentication.

For example, the user may select the window 162 and, in response to the selection, the log management module 152 may receive a second control signal 164 (referring now back to FIG. 2), that when received by the log management module 152 instruction may create and store a private version of the NCL 140 within the log storage module 154. Subsequently, the private version of the NCL 140 may be populated by the log management module 152 to include the various information (e.g., as shown in content list 136) based on the current indication of user-interest (e.g., the user may be interested in movie "A" because the user selected movie "A"). When the particular user subsequently selects the HNC icon 138 as discussed above, the private version of the NCL 140 may be presented. However, when a private version of the NCL 140 is not desired, a public version of the NCL 140 may be populated to include various information associated with the movie "A" based on the indication of user-interest. When the particular user subsequently selects the HNC icon 138 as discussed above, the public version of the NCL 140 may be presented. Generation and presentation of the content list 136 may be performed in a similar manner, with the exception that generation of the second control signal 164 may be in response to user-selection of the movie "A" using, for example, the cursor 134 as discussed above. Additional discussion of the indication of user-interest is provided below in connection with FIG. 4.

Figure 3:
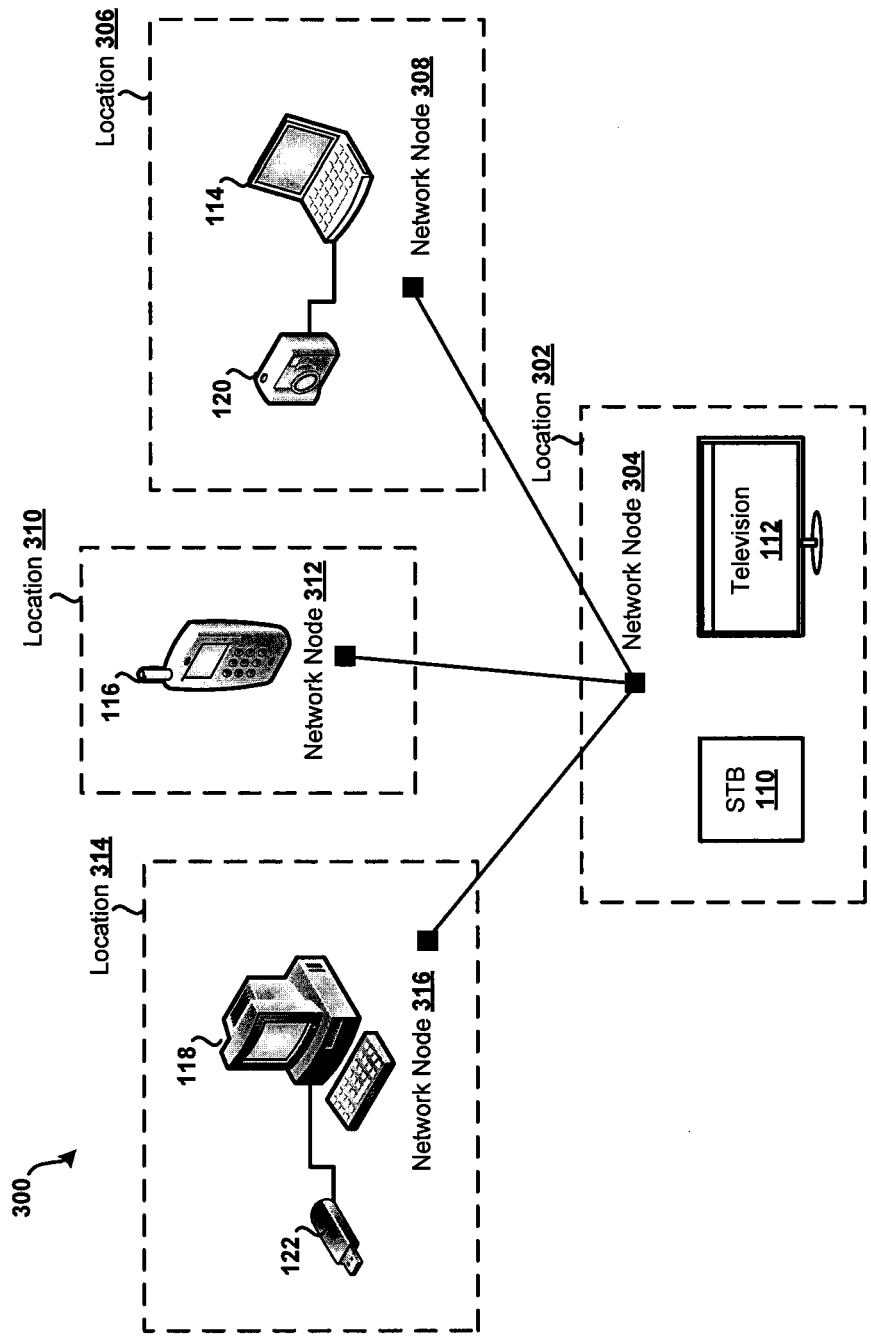
FIG. 3 illustrates an example diagram indicating placement of components of an example home network in spatial relation within a home premises.

Referring now to FIG. 3, an example diagram is shown indicating placement of components of the example network 124 of FIG. 1 in spatial relation within a home premises 300. In this example, particular information "advertised" by the respective devices of the example network 124 may be used to derive or otherwise infer location of a particular device within the premises 300. In the present example of FIG. 3, the STB 110 and the television 112 are shown positioned within a first area 302, such as a living room for example, of the premises 300. Positioned within the first area 302 is a first network node 304. Similarly, the laptop 114 and the device 120 are shown positioned within a second area 306, such as a kitchen for example, of the premises 300. Positioned within the second area 306 is a second network node 308. The smartphone 116 is shown positioned within a third area 310, such as a bedroom for example, of the premises 300. Positioned within the third area 310 is a third network node 312. Lastly, the personal computer 118 and the device 122 are shown positioned within a fourth area 314, such as a home office for example, of the premises 300. Positioned within the fourth area 314 is a fourth network node 316. Other embodiments are possible.

In general, the respective network nodes 304, 308, 312, and 316 may vary in breadth of functionality. For example, the first network node 304 may comprise at least one computing device with means of connecting the STB 110 and the television 112 to the network 124, and may have an additional capability of connecting various media devices (e.g., pluggable disks) to the network 124, and may further be fully functional DVRs, having a range of tuners, integrated hard disk drive(s), extensive connection capabilities, etc. In this example, while shown separate from the STB 110 and the television 112, the first network node 304 may alternately be incorporated within one of the STB 110 and the television 112. Similarly, in some embodiments, the STB 110 and the television 112 themselves may be incorporated within the same device.

The network nodes 308, 312, and 316 may differ in functionality from the first network node 304. For example, the respective network nodes 308, 312, and 316 may be implemented as low-cost computing device(s) when compared to the first network node 304. For example, the respective network nodes 308, 312, and 316 may only include means for connecting a particular device to the network 124, such an a broadband router, a WiFi router, and the like. In this manner, the network nodes 308, 312, and 316 may be generally lower cost than the first network node 304. However, in example embodiments, each of the respective network nodes 304, 308, 312, and 316 may have a unique network address of file path that may be used to infer physical location of associated devices.

For example, the device 122 may have, when connected to the network 124, a network address or file path of "...\personal computer 118\device 122\C:\movies\Monty Python and the Holy Grail\..." In this manner, a user may be able to readily identify a "possible" or "probable" or "likely" physical location of the device 122 within the premises 300. For example, a particular user may access the HNG 132, as shown in FIG. 1, using the laptop 114, and then select the HNC icon 138 to access the NCL 140 when presented with a task of trying to quickly identify location of the device 122 within the premises 300. In this example, while the device 122 may not be connected to the network 124, a "probable" physical location, "the fourth area 314," of the device 122 may be derived by, for example, the content availability engine 144 based on the network address or file path of device 122 as reported by the device 122 at a particular point in time. The physical location of the device 122 may be "possible" or "probable" or "likely" because the physical location may be inferred or estimated from the network address or file path of device 122. Subsequently, the content availability engine 144 may populate the NCL 140 such that when the NCL 140 is presented, a label "Device Location: fourth area 314" may be used to identify a probable physical location of the device 122. Such an implementation may be beneficial in many respects. For example, from the NCL 140, the particular user may be able to readily identify the device 122 as needed to be connected to the network 124 for the user to continue accessing particular media content of the device 122, as well as a enable or otherwise facilitate the user in tracking down the device 122 within the premises 300 in instances where it may be required that the device 122 be connected to the network 124 for the user to continue accessing particular media content associated with the device 122. Such example benefits may be realized by logging information within at least one public version of the NCL 140, and optionally at least one private version of the NCL 140.

Figure 4:
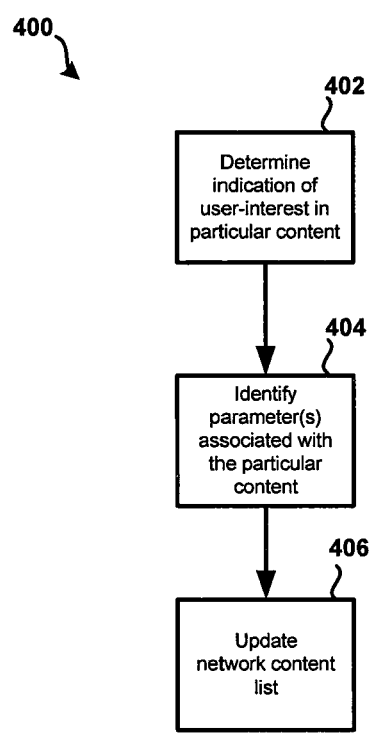
FIG. 4 shows a flowchart of an example method for logging information associated with network discoverable media content.

For example, referring now to FIG. 4, an example method 400 for logging information associated with network discoverable media content is shown in accordance with the principles of the present disclosure. In general, the method 400 may be implemented by the STB 110 as described above in connection with FIGS. 1-3. Other embodiments are possible. For example, one or more modules of the example method 400 may be implemented by one or more of the other respective devices or components within the example system 100 described above. Still other embodiments are possible.

The example method 400 may include determining (module 402), by a particular computing device, an indication of user-interest of particular media content that is accessible or otherwise discoverable over a particular home network. In general, the particular media content may be associated with, housed or stored by, etc., any of one or more computing resources, including the particular computing device. For example, the particular media content may be stored locally to the particular computing device. Alternately, the particular media content may be stored by or on a computing resource that is coupled to the particular computing device, or that is coupled to another computing resource that is at least temporarily connected to the particular home network. Other embodiments are possible.

In one example implementation for determining the indication of user-interest of the particular media content, a resource identifier associated with a particular computing resource may be presented within a user-interface on a display of the particular computing system. An example of a resource identifier may correspond to the identifier of "Device 122" as shown within the HNG 132 of FIG. 1. The resource identifier may be presented within the user-interface as part of a discovery process in which, upon connection of the particular computing resource to the network, an automated device detection and configuration sequence may be implemented that populates the resource identifier within the user-interface on the display. Additionally, a content identifier associated with the particular media content may also be presented, in association with the resource identifier, within the user-interface on the display of the particular computing system. An example of a content identifier may correspond to the identifier movie "A" as shown within the HNG 132 of FIG. 1.

In one embodiment, the indication of user-interest of the particular media content may be "directly" determined or identified upon a particular user accessing content associated with the content identifier. For example, continuing with the movie "A" description throughout for simplicity, an indication of user-interest of the movie "A" may be "directly" determined upon the particular user selecting, using the cursor 134 for example, and watching the movie "A" on the television 112. In another embodiment, the indication of user-interest of the particular media content may be "indirectly" determined or identified upon the particular user setting a "tag" or a "flag" associated with the content identifier. For example, an indication of user-interest of the movie "A" may be "indirectly" determined upon the particular user selecting, using the cursor 134 and "right-clicking" for example, a "flag" or a "tag" (e.g., by selecting an "I'm interested in this content" item from a pick list accessed via "right click") that is associated with the content identifier. The "flag" or "tag" may have underlying metadata that may designate the particular media content as a specific "item-of-interest." In this manner, the indication of user-interest of the particular media content may be derived or otherwise inferred from a "direct" or "indirect" interaction with the particular media content. Still other embodiments are possible.

The example method 400 may further include identifying (module 404), by the particular computing device in response to the indication of user-interest, one or more parameters that are directly or indirectly associated with the particular media content. One example parameter may include an content identification parameter that designates a name of the movie "A" (e.g., "Monty Python and the Holy Grail"). Another example parameter may include an address parameter that designates a current network address or file path of the movie "A" (e.g., " . . . \personal computer 118\ device 122\C:\movies\Monty Python and the Holy Grail. Another example parameter may include a resource identification parameter that designates a name of the device 122 ("My Pluggable Disk"). Another example parameter may include a location parameter that designates a "probable" physical location of the device 122 (e.g., "Home Office"). Another example parameter may include a temporal parameter that designates when the movie "A" was most recently accessed (e.g., "Jan. 1, 2000/16:00 BST"). Another example parameter may include a status parameter of the movie "A" that designates when the movie "A" was most recently accessed (e.g., "Partially Watched" such as "75%" complete). Still other parameters are possible.

The example method 400 may further include updating (module 406), by the particular computing device, a particular log or network content list associated with the particular user and/or a particular user account to include the one or more identified (see module 404) parameters that are directly or indirectly associated with the particular media content. For example, an authentication such as a username/password or other type of credential information may be used to access a particular public or private version of the NCL 140 as stored within the log storage module 154 as shown in FIG. 2. Upon access, the NCL 140 may be updated to include the above-example content identification parameter, address parameter, resource identification, location parameter, temporal parameter and status parameter. Such parameters may, for example, be organized within the NCL 140 in association with the device 122.

Figure 5:
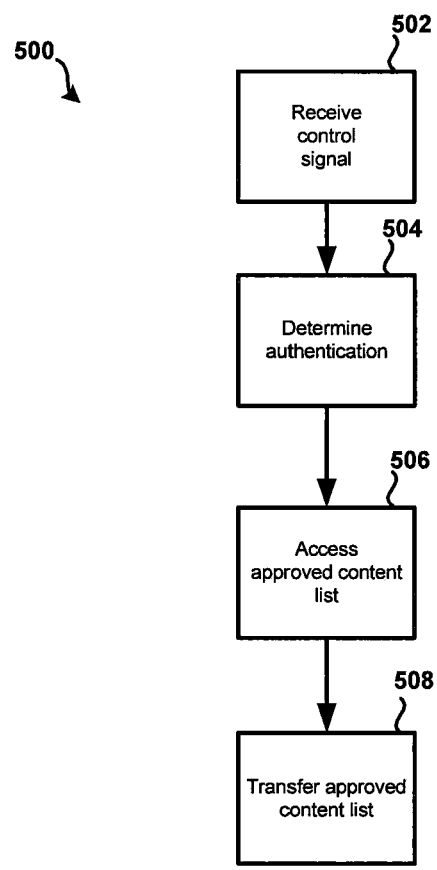
FIG. 5 shows a flowchart of an example method for accessing log information associated with network discoverable media content.

As mentioned above, a number of example benefits may be realized by logging information within at least one public version of the NCL 140, and optionally at least one private version of the NCL 140. For example, by enabling access to a tailored, user-specific version of the NCL 140 an increasingly positive user quality of experience may be realized in the context of delivering and sharing content over a network. Referring now to FIG. 5, an example method 500 for accessing log information associated with network discoverable media content is shown in accordance with the principles of the present disclosure. In this example, the method 500 is described with reference to the STB 110 as described above in connection with FIGS. 1-4. Other embodiments are possible. For example, one or more modules of the method 500 may be implemented by one or more of the other respective devices or components within the example system 100 described above. Still other embodiments are possible.

At module 502, the control signal 160 may be received by the STB 110. In this example, the control signal 160 may be generated in response to user-selection of the HNC icon 138, via a "point and click" gesture using the cursor 134 for example, as shown in FIG. 1. However, other embodiments are possible. For example, in one embodiment, the control signal 160 may be generated in response to user-selection of a particular "currently available" content item (e.g., movie "A") that is presented within the HNG 132. Still other embodiments are possible.

At module 504, the STB 110 may analyze the control signal 160 to derive an authentication that designates whether a public or private version of the NCL 140 is to be retrieved. As discussed above, an example authentication may include a username/password or other type of credential information that may be used by the STB 110 to determine whether a user and/or a user account associated with the control signal 160 is associated with a private version of the NCL 140. Usage of a private version NCL 140 may be beneficial in many respects. For example, in a scenario in which particular media content as stored on a particular device is private or otherwise "protected" (e.g., a document stored on a device that has restricted read/write access), information associated with such media content (e.g., Title, File Path, Source Device, Device Location, etc.) may be restricted by the STB 110 from being populated into a public version NCL 140. This may aid or facilitate in preventing unauthorized access of the private or otherwise "protected" media content. Other benefits flow from such an implementation as well.

At module 506, the STB 110 may access, based on the authentication, a public version of the NCL 140, or an appropriate private version of the NCL 140. In general, any number of private versions of the NCL 140 may exist. For example, in a typical family of four (4), a single public version of the NCL 140 may exist that is accessible to each member of the family. Additionally, four (4) separate private versions of the NCL 140 may, each version include particular content that may be exclusive to a particular version. For example, a first private version of the NCL 140 may be authorized for viewing or use by a particular "user A," a second private version of the NCL 140 may be authorized for viewing or use by a particular "user B," a third private version of the NCL 140 may be authorized for viewing or use by a particular "user C," and a fourth private version of the NCL 140 may be authorized for viewing or use by a particular "user D." In this example, when user A is signed-in to a particular device (e.g., laptop 114) using, for example, a particular username/password, the user A may only be able to access the first private version of the NCL 140 (and/or content list 136) and a public version of the NCL 140 in manners such as described above. A similar restriction may apply to the user B, user C, and user D.

At module 508, the STB 110 may pass a corresponding version of the NCL 140 as accessed at module 506 to the communication interface 148 for output to, for example, the television 112 for presentation. In general, the corresponding version of the NCL 140 may be fully or at least partially superimposed over the HNG 132 and/or EPG 130 as displayed on the television 112. Additionally, any supported user-interface features and or functionality (e.g., multi-touch, voice, etc.) may be provided for interaction with content contained within the NCL 140, which may or may not be interface-implementation specific.

Figure 6:
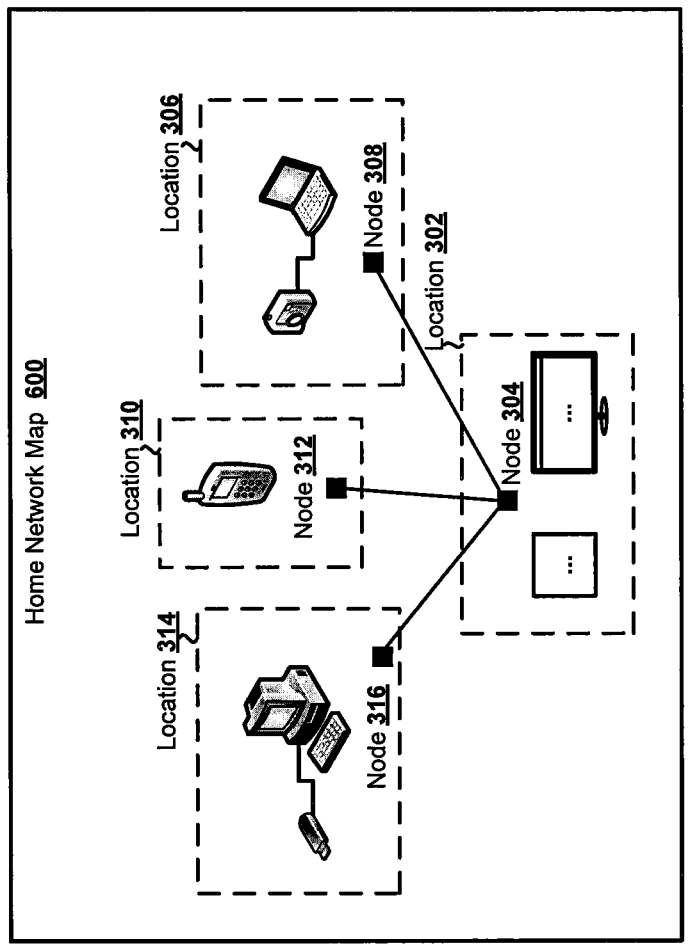
FIG. 6 shows an example home network map.

Referring now to FIG. 6, an example home network map 600 is shown in accordance with the present disclosure. In this example, the home network map 600 may be presented (e.g., fully or at least partially superimposed over the HNG 132 and/or EPG 130 of FIG. 1) upon selection (e.g. via cursor 134) of a selectable HMN (Home Network Map) icon 166 within the HNG 132 as shown in FIG. 1. The home network map 600 may present any combination of a graphical, textual, and geographical (e.g., related to physical location) indication of particular nodes that are currently connected to or with a particular home network. For example, in one embodiment, and assuming that the STB 110, the television 112, the laptop 114, the device 120, the smartphone 116, the personal computer 118, and the device 122 are all connected to or with the example network 124, the example diagram of FIG. 3 may itself be displayed within the home network map 600. Still other embodiments are possible as well.

Figure 7:
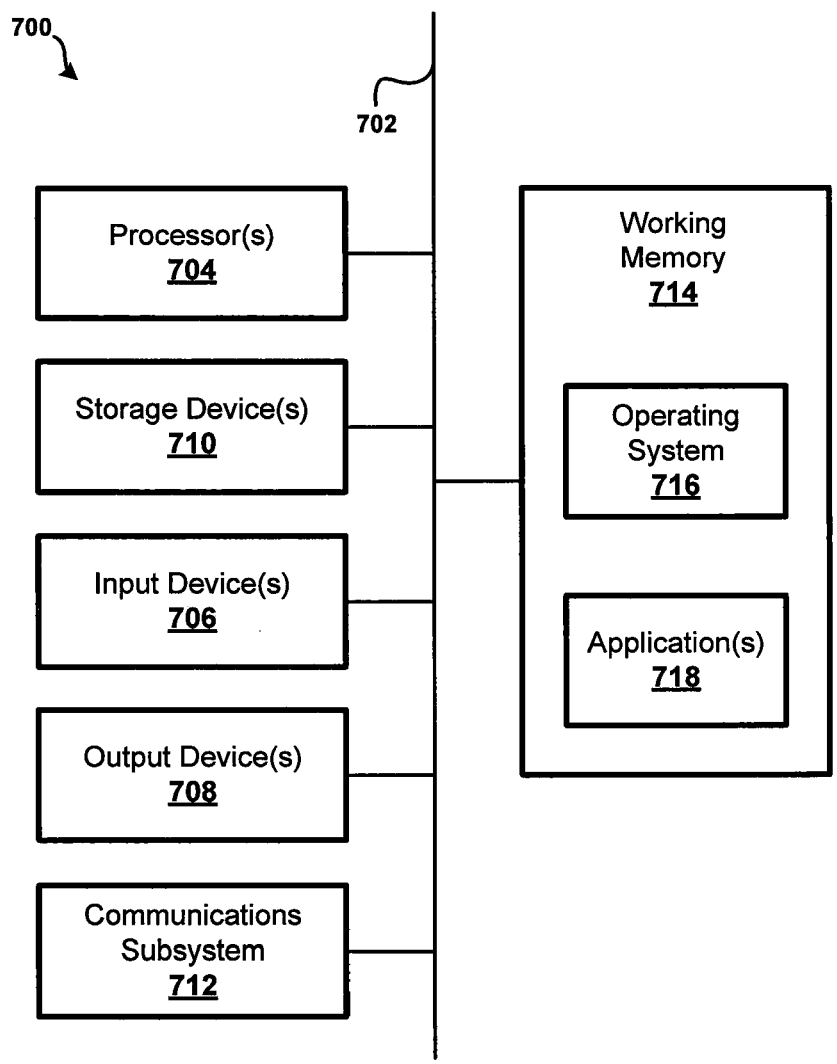
FIG. 7 shows an example computing system or device.

Referring now to FIG. 7, an embodiment of an example computer system or device 700 is shown. An example of a computer system or device includes an enterprise server, blade server, desktop computer, laptop computer, personal data assistant, smartphone, gaming console, set-top-box, and any other type machine for performing calculations. The computer system 700 may be wholly or at least partially incorporated as part of previously-described computing devices, such as, the STB 110, television 112, laptop 114, smartphone 116, personal computer 118, first pluggable device 120, and second pluggable device 122 of FIG. 1. The example computer device 700 may be configured to perform and/or include instructions that, when executed, cause the computer system 700 to perform the method of FIGS. 4 and 5. The example computer device 700 may also be configured to perform and/or include instructions that, when executed, cause the computer system 700 to generate any number of graphical user interfaces, such as at least the EPG 130, HNG 132, content list 136, NCL 140, window 162, and the home network map 600 as described above. It should be noted that FIG. 7 is intended only to provide a generalized illustration of various components, any or all of which may be utilized as appropriate. FIG. 7, therefore, broadly illustrates how individual system elements may be implemented in a relatively separated or relatively more integrated manner.

The computer device 700 is shown comprising hardware elements that can be electrically coupled via a bus 702 (or may otherwise be in communication, as appropriate). The hardware elements may include a processing unit with one or more processors 704, including without limitation one or more general-purpose processors and/or one or more special-purpose processors (such as digital signal processing chips, graphics acceleration processors, and/or the like); one or more input devices 706, which can include without limitation a remote control, a mouse, a keyboard, and/or the like; and one or more output devices 708, which can include without limitation a presentation device (e.g., television), a printer, and/or the like.

The computer system 700 may further include (and/or be in communication with) one or more non-transitory storage devices 710, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

The computer device 700 might also include a communications subsystem 712, which can include without limitation a modem, a network card (wireless or wired), an infrared communication device, a wireless communication device, and/or a chipset (such as a Bluetooth™ device, an 802.11 device, a WiFi device, a WiMax device, cellular communication facilities (e.g., GSM, WCDMA, LTE, etc.), and/or the like. The communications subsystem 712 may permit data to be exchanged with a network (such as the network described below, to name one example), other computer systems, and/or any other devices described herein. In many embodiments, the computer system 700 will further comprise a working memory 714, which can include a RAM or ROM device, as described above.

The computer device 700 also can comprise software elements, shown as being currently located within the working memory 714, including an operating system 716, device drivers, executable libraries, and/or other code, such as one or more application programs 718, which may comprise computer programs provided by various embodiments, and/or may be designed to implement methods, and/or configure systems, provided by other embodiments, as described herein. Merely by way of example, one or more procedures described with respect to the method(s) discussed above, and/or system components might be implemented as code and/or instructions executable by a computer (and/or a processor within a computer); in an aspect, then, such code and/or instructions can be used to configure and/or adapt a general purpose computer (or other device) to perform one or more operations in accordance with the described methods.

A set of these instructions and/or code might be stored on a non-transitory computer-readable storage medium, such as the storage device(s) 710 described above. In some cases, the storage medium might be incorporated within a computer system, such as computer system 700. In other embodiments, the storage medium might be separate from a computer system (e.g., a removable medium, such as flash memory), and/or provided in an installation package, such that the storage medium can be used to program, configure, and/or adapt a general purpose computer with the instructions/code stored thereon. These instructions might take the form of executable code, which is executable by the computer device 700 and/or might take the form of source and/or installable code, which, upon compilation and/or installation on the computer system 700 (e.g., using any of a variety of generally available compilers, installation programs, compression/decompression utilities, etc.), then takes the form of executable code.

It will be apparent to those skilled in the art that substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

As mentioned above, in one aspect, some embodiments may employ a computer system (such as the computer device 700) to perform methods in accordance with various embodiments of the invention. According to a set of embodiments, some or all of the procedures of such methods are performed by the computer system 700 in response to processor 704 executing one or more sequences of one or more instructions (which might be incorporated into the operating system 716 and/or other code, such as an application program 718) contained in the working memory 714. Such instructions may be read into the working memory 714 from another computer-readable medium, such as one or more of the storage device(s) 710. Merely by way of example, execution of the sequences of instructions contained in the working memory 714 may cause the processor(s) 704 to perform one or more procedures of the methods described herein.

The terms "machine-readable medium" and "computer-readable medium," as used herein, refer to any medium that participates in providing data that causes a machine to operate in a specific fashion. In an embodiment implemented using the computer device 700, various computer-readable media might be involved in providing instructions/code to processor(s) 704 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 710. Volatile media include, without limitation, dynamic memory, such as the working memory 714.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 704 for execution. Merely by way of example, the instructions may initially be carried on a magnetic disk and/or optical disc of a remote computer. A remote computer might load the instructions into its dynamic memory and send the instructions as signals over a transmission medium to be received and/or executed by the computer system 700.

The communications subsystem 712 (and/or components thereof) generally will receive signals, and the bus 702 then might carry the signals (and/or the data, instructions, etc. carried by the signals) to the working memory 714, from which the processor(s) 704 retrieves and executes the instructions. The instructions received by the working memory 714 may optionally be stored on a non-transitory storage device 710 either before or after execution by the processor(s) 704.

The methods, systems, and devices discussed above are examples. Various configurations may omit, substitute, or add various method steps or procedures, or system components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Furthermore, the example embodiments described herein may be implemented as logical operations in a computing device in a networked computing system environment. The logical operations may be implemented as any combination of: (i) a sequence of computer implemented instructions, operations, steps, and/or modules running on a computing device; and (ii) interconnected logical or hardware modules running within a computing device.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for logging information associated with network discoverable media content, comprising:
presenting, on a computing system, a network guide that displays a plurality of media content accessible to the computing system over a home computing network;
identifying, by the computing system, an indication of user-interest of particular media content that is associated with a particular computing device other than the computing system, the particular computing device and the computing system at least temporarily connected over the home computing network;
determining, by the computing system and based on the indication of user-interest, an address identification parameter that specifies a distinct network file path of the particular media content;
deriving, by the computing system and based on the address identification parameter, a location parameter that specifies an estimated physical location of the particular computing device within the home computing network;
storing, by the computing system, the address identification parameter within a network accessible media content log, the media content log presented within a display associated with the computing system based on user-selection of a particular designator within the display; and
presenting a selectable icon in response to user-selection of the particular media content within the network guide, the selectable icon when selected instantiating an algorithm that creates a private version of the media content log.

2. The method of claim 1, further comprising identifying the indication of user-interest of the particular media content based on a user-selection to access the particular media content.

3. The method of claim 1, further comprising identifying the indication of user-interest of the particular media content based on a user-selection to enable a parameter that identifies the particular media content as a particular item of interest.

4. The method of claim 1, further comprising identifying and storing within the media content log, based on the indication of user interest, a resource identification parameter that specifies a distinct identifier of the particular computing device, a content identification parameter that specifies a distinct identifier of the particular media content, a temporal parameter that specifies a preceding date and time of access of the particular media content, and a status parameter that is correlated to the temporal parameter and that specifies a particular state of the particular media content.

5. The method of claim 4, further comprising: identifying user-selection of the particular designator; and presenting the media content log within the display.

6. The method of claim 5, further comprising accessing the media content log based on an authenticated user-credential prior to presenting the media content log within the display.

7. A computer-implemented method, comprising:
presenting, on a computing system, a network guide that displays a plurality of media content accessible to the computing system over a home computing network;
identifying, by the computing system, an indication of user-interest of particular media content presented within the network guide;
identifying, by the computing system and based on the indication of user-interest, a plurality of parameters associated with the particular media content;
generating, by the computing system and based on at least one of the plurality of parameters, an address identification parameter that indicates an approximate physical location of a particular computing device within the home computing network;
logging, by the computing system, at least the address identification parameter within a network accessible media content log, the media content log presented within the network guide based on user-selection of a particular designator within the network guide; and
presenting a selectable icon in response to user-selection of the particular media content within the network guide, the selectable icon when selected instantiating an algorithm that creates a private version of the media content log.

8. The method of claim 7, further comprising identifying the indication of user-interest of the particular media content based on a user-selection to access the particular media content.

9. The method of claim 7, further comprising identifying the indication of user-interest of the particular media content based on a user-selection to enable a parameter that identifies the particular media content as a particular item of interest.

10. The method of claim 7, further comprising: presenting within the network guide the particular designator; receiving indication of user-selection of the particular designator; and presenting the media content log within the network guide.

11. The method of claim 7, further comprising: logging each of the plurality of parameters associated with the media content log; receiving indication of user-selection of the particular designator; and presenting the media content log within the network guide.

12. The method of claim 11, further comprising logging within the media content log a resource identification parameter that specifies a distinct identifier of the particular computing device, a content identification parameter that specifies a distinct identifier of the particular media content, a temporal parameter that specifies a preceding date and time of access of the particular media content, and a status parameter that is correlated to the temporal parameter and that specifies a particular state of the particular media content.

13. The method of claim 7, further comprising creating the private version of the media content log in response to selection of the selectable icon, the private version of the media content log accessible based on authentication of a particular user-specific credential.

14. The method of claim 7, further comprising presenting within the network guide a selectable network mapping icon; and presenting, in response to receiving indication of user-selection of the selectable network mapping icon, at least one of a graphical, textual, and geographical indication of particular nodes that are connected to the home computing network.

15. A method for logging information associated with network discoverable media content, comprising:

presenting, on a computing system, a network guide that displays a plurality of media content accessible to the computing system over a home computing network;

identifying, by the computing system, an indication of user-interest of particular media content that is associated with a particular computing device other than the computing system based on one of a user-selection to access the particular media content and a user-selection to enable a parameter that identifies the particular media content as a particular item of interest, the particular computing device and the computing system at least temporarily connected over the home computing network;

determining, by the computing system and based on the indication of user-interest, an address identification parameter that specifies a distinct network file path of the particular media content;

deriving, by the computing system and based on the address identification parameter, a location parameter that specifies an estimated physical location of the particular computing device within the home computing network;

storing, by the computing system, the address identification parameter within a network accessible media content log, the media content log presented within a display associated with the computing system based on user-selection of a particular designator within the display;

identifying and storing within the media content log, based on the indication of user interest, a resource identification parameter that specifies a distinct identifier of the particular computing device, a content identification parameter that specifies a distinct identifier of the particular media content, a temporal parameter that specifies a preceding date and time of access of the particular media content, and a status parameter that is correlated to the temporal parameter and that specifies a particular state of the particular media content; and presenting a selectable icon in response to user-selection of the particular media content within the network guide, the selectable icon when selected instantiating an algorithm that creates a private version of the media content log.

* * * * *